United States Patent [19]

Lake

[11] Patent Number: 5,145,651

[45] Date of Patent: Sep. 8, 1992

[54] SYSTEM TO MITIGATE THE EFFECT OF AN ENVIRONMENTAL RELEASE OF A CONTAMINANT GAS

[75] Inventor: Robin B. Lake, Cleveland Heights, Ohio

[73] Assignee: The Standard Oil Company, Cleveland, Ohio

[21] Appl. No.: 652,466

[22] Filed: Feb. 7, 1991

Related U.S. Application Data

[63] Continuation of Ser. No. 176,431, Apr. 1, 1988, abandoned.

[51] Int. Cl.⁵ .............................................. B01D 51/00
[52] U.S. Cl. .................................. 422/168; 422/129; 423/210
[58] Field of Search ................ 422/129, 168; 423/210

[56] References Cited

U.S. PATENT DOCUMENTS

| Re. 27,507 | 10/1972 | Turpin | 422/168 |
|---|---|---|---|
| 3,337,455 | 8/1967 | Wilson et al. | 423/210 |
| 3,512,911 | 5/1970 | Reed et al. | 422/168 |
| 3,554,681 | 1/1971 | Proctor | 422/168 |
| 3,563,697 | 2/1971 | De Castro | 422/168 |
| 3,840,320 | 10/1974 | Desty et al. | 431/4 |
| 4,084,935 | 4/1978 | Reed et al. | 422/168 |
| 4,252,070 | 2/1981 | Benedick | 422/168 |
| 4,464,110 | 8/1984 | Boden et al. | 431/350 |
| 4,486,167 | 12/1984 | McMurray et al. | 431/114 |
| 4,486,168 | 12/1984 | Pratley | 431/202 |
| 4,664,617 | 5/1987 | Schwartz et al. | 431/8 |

FOREIGN PATENT DOCUMENTS 1459087 12/1976 United Kingdom .
1604441 12/1981 United Kingdom .

Primary Examiner—Robert J. Warden
Assistant Examiner—Timothy M. McMahon
Attorney, Agent, or Firm—Larry W. Evans; John E. Miller; Teresan W. Gilbert

[57] ABSTRACT

A system to mitigate the effect of an environmental release of a contaminant gas. The system includes at least one first fluid effect device (13) positioned in the vicinity of the environmental release (33). A first fluid stream (20), a second fluid stream (23) and a flame (24) may each selectively be discharged from the first fluid device (13) in proximity to the contaminant gas. At least one second fluid effect device (25) also may be positioned in the vicinity of the environmental release (33) and the first fluid effect device (13). A third fluid stream (30) may be discharged from the second fluid device (25) proximate to the contaminant gas. A method to mitigate the effect of an environmental release of a contaminant gas employing the foregoing system is likewise embodied herein.

5 Claims, 4 Drawing Sheets

SYSTEM TO MITIGATE THE EFFECT OF AN ENVIRONMENTAL RELEASE OF A CONTAMINANT GAS

This application is a continuation of application Ser. No. 176,431, filed Apr. 1, 1988 now abandoned.

TECHNICAL FIELD

The present invention relates generally to a system to mitigate the effect of an environmental release of a contaminant gas. More particularly, the present invention relates to a system to control the spread of a contaminant gas cloud released into the environment. Specifically, the present invention relates to a system to diffuse and/or neutralize the contaminant gas cloud rendering it less hazardous to the surrounding environment. To elaborate on this aspect, the present invention relates to a system having a plurality of fluid effect devices capable of diffusing, diluting and diverting a cloud of contaminant gas; and further capable of chemically altering the contaminant gas to render it environmentally safe. A method for mitigating the effect of the contaminant gas release using the invention also is provided.

BACKGROUND ART

Many industrial plants store large quantities of chemical compounds which are used in processing operations or are produced by such processing operations. Many of these compounds, if released into the atmosphere, could prove quite hazardous to people and the environment. As many industrial plants are located near population centers, the risk of injury to the people from such a release is great. It is imperative, then, that efforts be taken to prevent the release of these compounds or, if released, to prevent the spread of the compound to the populated area.

Depending on the type of chemical compound, a release—as for example from a ruptured line or tank—may be in the form of a liquid spill or a gas or vapor release. Liquid spills are more easily contained through the use of dams, dikes, liquid brooms and the like. The pooled liquid material may, however, continue to provide a significant source of vapors as the pooled material evaporates.

A sudden or sustained release of a material stored at a pressure or temperature other than ambient temperature and pressure may produce a significant fraction of the released material as vapor and/or aerosol, due to the change in enthalpy of the stored versus released material. A release in the form of a gas or vapor poses a greater difficulty. The gas or vapor can originate directly from a ruptured line or vessel of the processing or storage equipment, or it may originate from surface vaporization of a pool of collected liquid or due to a change from storage to ambient temperature or pressure. If the gas or vapor is lighter than air, as for example a fluorocarbon, it will rise from its source to be disposed in the upper regions of the atmosphere, thereby creating little risk to the local environment. However, if the vapor or gas is neutrally buoyant or heavier than air, or cryogenic or transiently polymeric—as for example hydrogen fluoride—, it will tend to form a contaminant cloud which will remain near ground level.

These contaminant clouds may be influenced by local terrain as well as prevailing meteorological conditions. Particularly dense contaminant clouds may be long-lasting, slow to entrain air, and may present hazardous concentrations over long distances. Some materials which, if released into the environment, may form hazardous contaminant clouds include ammonia, acrylonitrile, hydrogen cyanide, hydrogen fluoride, hydrogen sulfide, alkylation acid, chlorine, tetraethyl lead and hydrocarbons, to name but a few.

Current practices to control, diffuse or neutralize contaminant clouds are ineffective in most instances. One practice involves the erection of physical, impermeable barriers. The barriers may be in the form of walls made of suitable plastic material which provide some retardation of the leading edge of the contaminant cloud. However, once the contained area fills with the contaminant material, the cloud will flow over the top, creating yet another hazardous release.

Furthermore, such physical barriers are unsafe, indeed dangerous, in the event of a release of a hydrocarbon. The turbulence caused when a highly concentrated hydrocarbon cloud strikes the physical barrier may set off an unconstrained vapor cloud explosion. Such explosions have reached forces of 10 kilotons. Accordingly, when physical barriers are employed around a facility wherein a hydrocarbon is one of several stored chemical compounds, it must be possible to establish and remove the barrier quickly in the event of a hydrocarbon release.

Other practices to control or mitigate the contaminant cloud include water or chemical sprays. Water sprays may serve temporarily to reduce the cloud concentration but create a contaminated aqueous solution which itself must be controlled, and which may revaporize, creating a new release source. Chemical sprays may react with the cloud, altering its chemical composition or physical state and rendering it non-hazardous. Such sprays, however, may react with a limited amount of the contaminant cloud, leaving the remainder to continue posing an environmental hazard.

If the contaminant cloud originates from a pool of contaminant, a foam or cover may be applied over the surface of the pool to reduce vaporization. Such measures are effective only for pools and then only for some liquid contaminants.

Yet another practice to mitigate the effects of contaminant clouds is to apply heat, in the form of flares or steam sprays. The heated cloud may become less dense, to the point of being buoyant, thereby rising into the atmosphere and away from the local environment. In addition, the flare may burn the contaminant thereby chemically altering it into a manageable form, such as a precipitate or non-hazardous gas. The use of steam sprays or flares, however, generally have less than desirable results. The heated cloud may rise temporarily but later may again become denser as it cools, returning to ground level in a continued hazardous concentration. Additionally, some contaminants are explosive in concentrated form, thus making the use of flares and open flames extremely dangerous.

Despite the wide use of chemical compounds in industrial operations and the great potential for environmental releases of such compounds, and further despite the hazards such releases may pose for the local environment, no effective practice has previously been developed to control, dissipate, neutralize or otherwise mitigate the effect of the contaminant clouds formed by such release. The known practices for countering environmental releases of contaminants are limited to the types of contaminants for which they may be used; and, even when usable, these practices are moderately effective, at best.

DISCLOSURE OF THE INVENTION

It is, therefore, a primary object of the present invention to provide a system to mitigate the effect of an environmental release of a contaminant gas.

It is another object of the present invention to provide a system, as above, which is effective in dissipating and/or neutralizing the contaminant gas, rendering it environmentally less hazardous.

It is a further object of the present invention to provide a system, as above, which can effectively be used with a variety of different chemical contaminants.

It is still another object of the present invention to provide a system, as above, which can be installed about a facility housing different chemical compounds and be activated as necessary corresponding to a release of a particular contaminant.

These and other objects of the invention, as well as the advantages thereof over existing and prior art forms, which will be apparent in view of the following specification, are accomplished by means hereinafter described and claimed.

In general, a system to mitigate the effect of an environmental release of a contaminant gas includes at least one first fluid effect device positioned in the vicinity of the environmental release. Means are provided to discharge selectively a first fluid stream in proximity to the contaminant gas from the first fluid effect device. The first fluid stream entrains at least some of the contaminant gas.

A method to mitigate the effect of an environmental release of a contaminant gas includes presenting at least one first fluid effect device in the vicinity of the environmental release. A first fluid stream is discharged from the first fluid effect device in proximity to the contaminant gas. In this manner, at least some of the contaminant gas is entrained into the first fluid stream.

Preferred and alternative embodiments of a system to mitigate the effect of an environmental release of a contaminant gas incorporating the concept of the present invention are shown by way of example in the accompanying drawings without attempting to show all the various forms and modifications in which the invention might be embodied, the invention being measured by the appended claims and not by the details of the specification.

PREFERRED MODE FOR CARRYING OUT THE INVENTION

Figure 1:
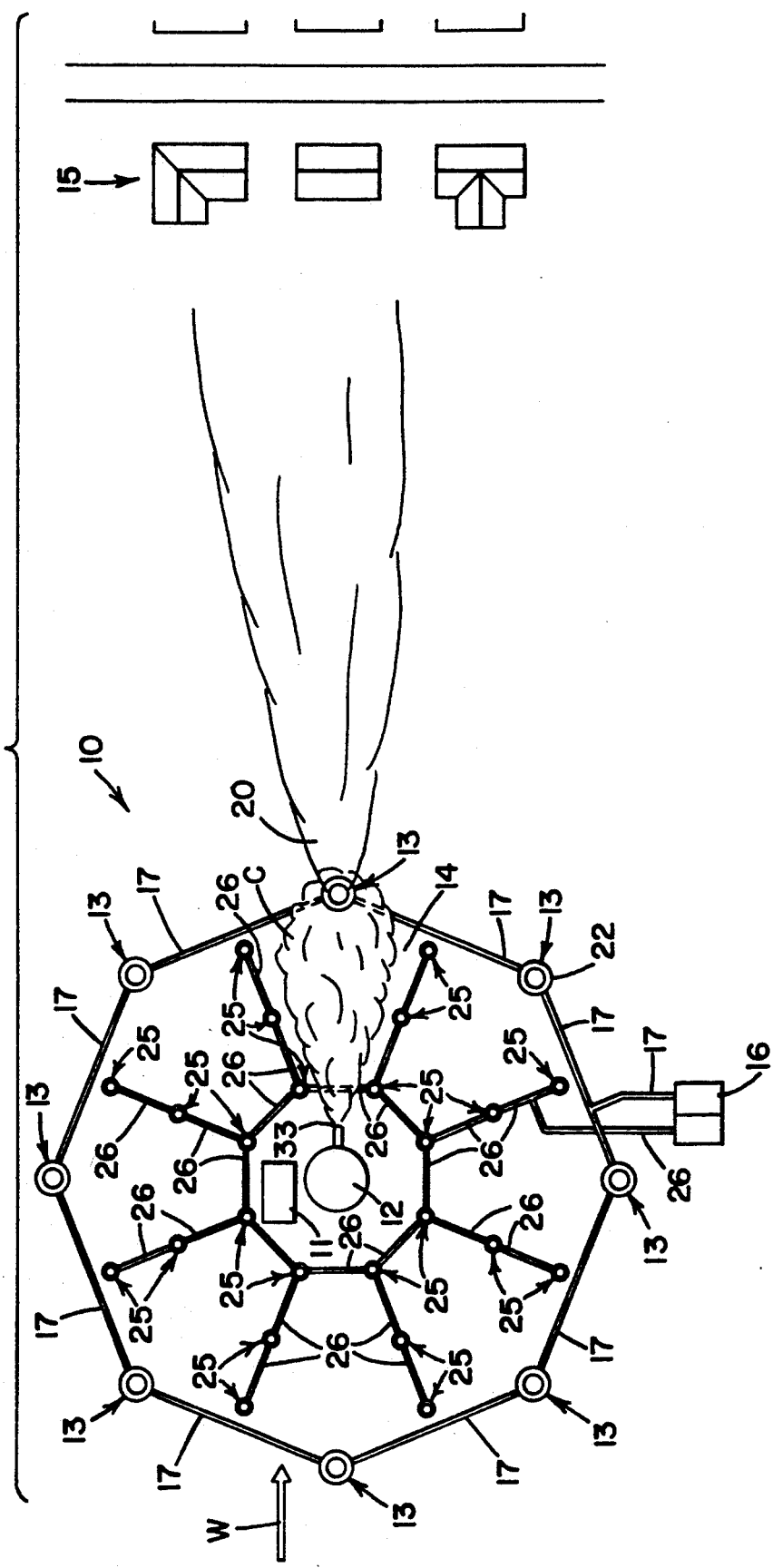
FIG. 1 is a schematic plan view of a system for mitigating the effect of an environmental release of a contaminant gas embodying the concept of the present invention.

A system to mitigate the effect of an environmental release of a contaminant gas is indicated generally by the numeral 10 in FIG. 1 of the attached drawings. The system 10 is depicted schematically in cooperation with an industrial facility 11 having a source of a hazardous chemical compound, as for example a tank 12 of hydrogen fluoride.

The system employs a plurality of fluid effect devices such as discharge nozzles 13 or similar air entrainment devices, preferably located about the facility 11 to define the perimeter of a control zone 14.

Such nozzles 13 are not limited in location to the perimeter as they also may be distributed throughout the interior of control zone 14. The exact location of nozzles 13 may be governed by the facility layout, topography and climatological conditions of the area, the physical and chemical characteristics of the contaminant and the amount of contaminant stored. At the very least, however, nozzles 13 should be located between contaminant tank 12 and the environment sought to be protected, as for example a town 15.

Nozzles 13 are fluidly interconnected with a fluid source 16, as by plumbing 17. As will be appreciated hereinbelow, fluid source 16 may be a source of any of a variety of pressurized control fluids including, for example, air, steam, water, neutralizing agents or any combination thereof. Each nozzle 13 may be fluidly interconnected to a corresponding fluid source or, as depicted in FIG. 1, they may be interconnected to one or more central fluid sources 16. Alternatively, each nozzle 13 may be provided with a suitable compressor integral therewith. Such compressor, as would be appreciated by one skilled in the art, would be capable of generating pressurized control fluids from the surrounding atmosphere including any contaminant gas vapors.

A suitable nozzle 13 determined to be quite effective as a fluid effect device is a Coanda nozzle. Such nozzles have been found to produce an exhaust of control fluid in a manner permitting maximum entrainment of the surrounding air and gases, for reasons which will be appreciated hereinbelow.

Figure 2:
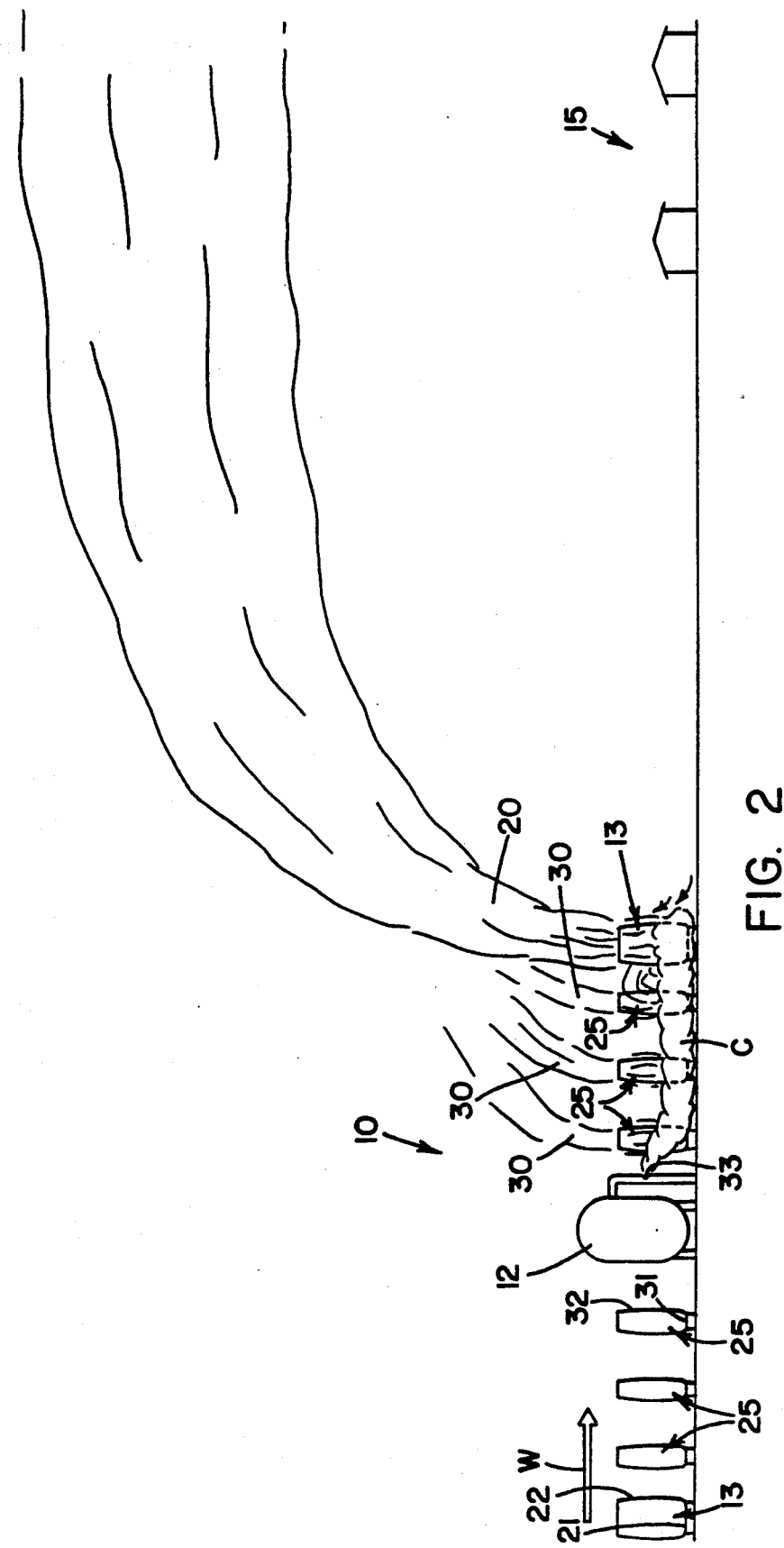
FIG. 2 is a fragmentary schematic side elevation view of the system depicted in FIG. 1.
Figure 3:
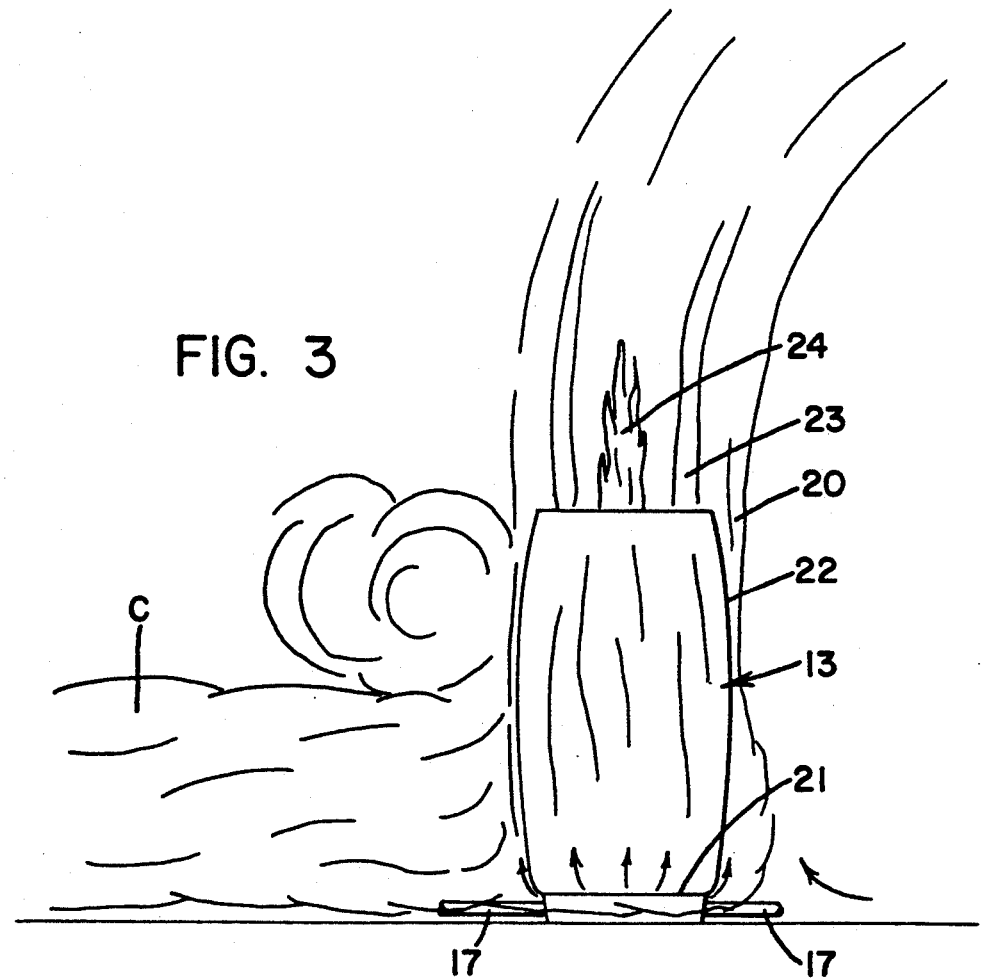
FIG. 3 is an enlarged schematic view of a primary air entrainment device of the system depicted in FIG. 1.

With reference to FIG. 2, nozzles 13 may be located at ground level; and are suitably configured and positioned to direct a primary exhaust stream 20 of control fluid upwards into the surrounding atmosphere. The size of nozzle 13 may vary depending upon the needs of the installation, but it is found to be desirable that exhaust stream 20 be capable of reaching a height at least as high as the upper limit of the hazardous concentration level of the contaminant cloud. The plume shape of exhaust stream 20, likewise, will vary depending upon the size and shape of nozzle 13. With reference to FIG. 3, it will be appreciated that the shape of the plume partially will govern the positioning of nozzles 13.

As discussed, hereinabove, nozzle 13 may be any of a variety of types, with a preferred type being a Coanda nozzle. The specific structure of a suitable Coanda nozzle 13 can be considered with reference to FIG. 3. An orifice 21 is provided circumferentially about the lower end of nozzle 13 to direct primary exhaust stream 20 upward along the outer surface 22 of nozzle 13. An inherent feature of Coanda nozzle 13, as is appreciated by one skilled in the art, is the tendency for exhaust stream 20 to follow the contour of outer surface 22, efficiently entraining the surrounding air and gases in the process. Indeed, entrainment ratios of 20:1 can be experienced whereby the volume of exhaust stream 20 increases up to twenty times from entrainment of the surrounding air and gas.

In view of this feature, it may be desirable to expose a substantial portion of outer surface 22 to a contaminant cloud C formed by an environmental release of a contaminant gas, as will be appreciated hereinbelow. It is preferred, then, that the height of Coanda nozzle 13 be equal substantially to the height of the hazardous concentration levels of the contaminant cloud C, or that the exhaust stream 20, at least, reach such height. Such height reasonably may be approximately 10 feet (3.0m) to 60 feet (18.3m), for typical stored volumes, surface roughness, meteorological conditions and storage conditions.

The diameter of Coanda nozzle 13 likewise will vary depending on the number of nozzles in the system and the local terrain of the installation. Also, the ability of the contaminant gas to entrain air, as well as its other physical and chemical characteristics must be considered. Generally, the diameter of such Coanda nozzle 13 may be approximately one-half to three times, the height of nozzle 13 or of nozzle 13 and exhaust stream 20, as would be known to one knowledgeable of such devices.

The area affected by the effects of Coanda nozzle 13 is substantially greater than its physical size. Indeed, the effects of Coanda nozzle 13, in the form of pressure gradients and controlled air-flow, may be five times or more in diameter as compared to the diameter of the particular nozzle. Therefore, with reference again to FIG. 1, nozzles 13 may be spaced apart a considerable distance from each other, provided that the effective area affiliated with each nozzle 13 preferably meets or slightly overlaps each other. In this manner, a continuous effective region may be established about control zone 14 to prevent the free release of contaminant gas.

Coanda nozzle 13 may be suitable for discharging more than merely a single control fluid. Indeed, it may be more suited to discharge a plurality of control fluids, or a control fluid with one or more materials. Again, referring to FIG. 3, Coanda nozzle 13 may provide primary exhaust stream 20 of a base control fluid, such as air, steam or the contaminant gas, for example, as discussed hereinabove, and a second exhaust stream or substance 23, agent discharged simultaneously therewith, to form a plume comprising a mixture of primary exhaust stream 20 and secondary exhaust stream 23. Secondary exhaust stream 23 may include a mitigating reactant, such as, for example, a neutralizer. Secondary exhaust stream 23 also preferably is discharged from the top of nozzle 13 interiorly of primary exhaust stream 20. The two exhaust streams can then mix with each other and with the contaminant gas in the region above nozzle 13. In addition, nozzle 13 may provide a flame 24 in conjunction with, or independently of, exhaust streams 20 and 23. Such a flame 24 may serve to heat or ignite the exhaust streams or the surrounding air or gases, as will be appreciated hereinbelow.

The system 10 may also include sets of smaller nozzles 25 which serve to confine a contaminant cloud C and redirect it toward a nozzle 13. These nozzles 25, may be identical to nozzles 13, although of a smaller scale. As depicted in FIG. 1, nozzles 25 may be positioned radially throughout control zone 14. Nozzles 25 also are fluidly interconnected through a suitable plumbing network 26 with each other and with a suitable fluid source. Such fluid source may be the same as source 16 or it may be an independent source, as would be appreciated by one skilled in the art.

Figure 4:
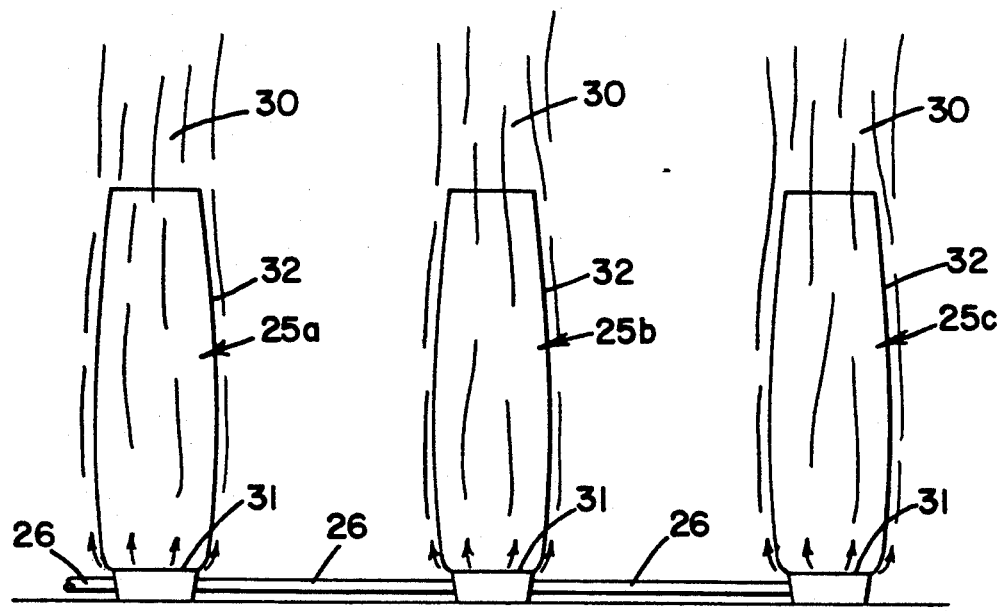
FIG. 4 is an enlarged fragmentary elevation view depicting a portion of secondary air entrainment devices of the system depicted in FIG. 1.

Nozzles 25 may be different from nozzles 13. Indeed, it is preferred that nozzles 25 be Coanda nozzles but they need not be capable of discharging more than a single control stream 30, inasmuch as the main purpose of nozzles 25 is to constrain and direct the contaminant cloud C to nozzle 13. Such control stream 30 may be discharged from a circumferential orifice 31 about the lower end of each nozzle 25, to flow upward along the outer surface 32 thereof. With reference to FIG. 4, a plurality of nozzles 25a, 25b and 25c may be provided in a radial manner to define a suitable barrier to the contaminant cloud C. Of course, the actual number and arrangement of nozzles 25 may vary depending upon the particular installation. As with nozzles 13, it is preferred that nozzles 25 be suitably located relative to each other such that the effective areas of each overlap to define an efficient barrier to the contaminant cloud. It also will be appreciated that nozzles 25 serve to entrain the contaminant cloud C with surrounding air and control fluid, thus aiding in the overall diffusion and disposal of the contaminant gas.

While the fluid effect devices of the present invention have been described hereinbefore as being mountable individually on the ground, such is not the exclusive mounting arrangement. To the contrary, depending upon the requirements of the installation, it may be desirable to mount nozzles 13 on an elevated support structure. Mounting a nozzle 13 on such a support structure enables the effect thereof to reach greater heights, or to reach such heights with smaller equipment.

The present invention may be more fully understood and appreciated by considering the same in operation to control an environmental release of a contaminant gas. Specifically, with reference to FIGS. 1 and 2, an exemplary situation can be considered involving the release of pressurized liquid hydrogen fluoride from a rupture 33 at a tank 12 which causes the formation of a dense contaminant cloud C. The prevailing wind W will cause the contaminant cloud C to travel down-wind, posing an imminent threat to the surrounding environment, for example, town 15. Due to the physical and chemical characteristics of hydrogen fluoride, the contaminant cloud C will tend to remain low to the ground and will be very slow to entrain air and rise or otherwise dissipate.

Upon notification of the release, either through automatic sensor, known in the art, or by actual observation, the present system 10 can be activated to mitigate the effects of the release. Specifically, the system 10 can be activated to release the control fluid from fluid source 16 through nozzles 13 about the perimeter of control zone 14. While the system 10 may be activated to discharge control fluid only from those nozzles 13 in the path of contaminant cloud C, it may be more preferable to discharge control fluid from all nozzles 13 and nozzles 25 to define an enclosed control zone 14 for the effective containment of contaminant cloud C.

When contaminant cloud C reaches the barriers defined by control streams 30, its progress over the ground will be curtailed significantly. The upward velocity of control streams 30 will mix with the edges of the contaminant cloud C thereby diffusing the latter with entrainment of the control fluid and the surrounding air and directing the contaminant cloud C to nozzles 13.

As the contaminant cloud C reaches the effective area of a nozzle 13, it is drawn into primary exhaust stream 20. When nozzle 13 emits only a primary stream 20, comprising air, steam, contaminant gas or the like, the effect is significantly to diffuse the contaminant cloud C and to direct the diffused cloud upwardly into the upper atmosphere from where it will continue downstream passing safely above the local ground environment. As it continues downstream at these higher elevations, the contaminant cloud C will continue to diffuse in the jet stream until it is completely dispersed.

It will be appreciated that not all of the contaminant cloud C readily will be drawn into primary exhaust stream 20. That which is not drawn in will be carried by the controlled air currents surrounding nozzle 13. There it will be recirculated into the main body of the contaminant cloud C continually until it is drawn into primary exhaust stream 20 or until it has entrained sufficient air to disperse naturally and safely into the atmosphere.

It may be desirable to expedite the mitigation of the contaminant cloud C at control zone 14 by using a secondary fluid having a neutralizing compound. For hydrogen fluoride, such a neutralizing material could be a calcium-containing material, such as calcium carbonate. The neutralizing material may be a homogeneous mixture in the primary exhaust stream 20 from nozzle 13; but it may be more preferable to employ secondary exhaust stream 23 to introduce the neutralizing material. In this manner, a greater amount of primary exhaust stream 20 can be interjected into the contaminant cloud C to ensure mixing of the neutralizing material of secondary exhaust stream 23 and also adequate entrainment of atmospheric air. It should be appreciated that introduction of calcium carbonate into a cloud of hydrogen fluoride in this manner will cause a chemical reaction, thus forming calcium fluoride, a non-toxic mineral precipitate easily absorbable by the ground environment.

In addition to the introduction of a neutralizing agent, or as an alternative thereto, flame 24 may be presented to the contaminant cloud C. Depending upon the particular contaminant, flame 24 may burn the contaminant or otherwise chemically convert it into a less hazardous or even non-hazardous form. At the very least, flame 24 will heat the contaminant cloud C to reduce its density and enable it to rise to a safe elevation, away from the local ground environment.

Figure 5:
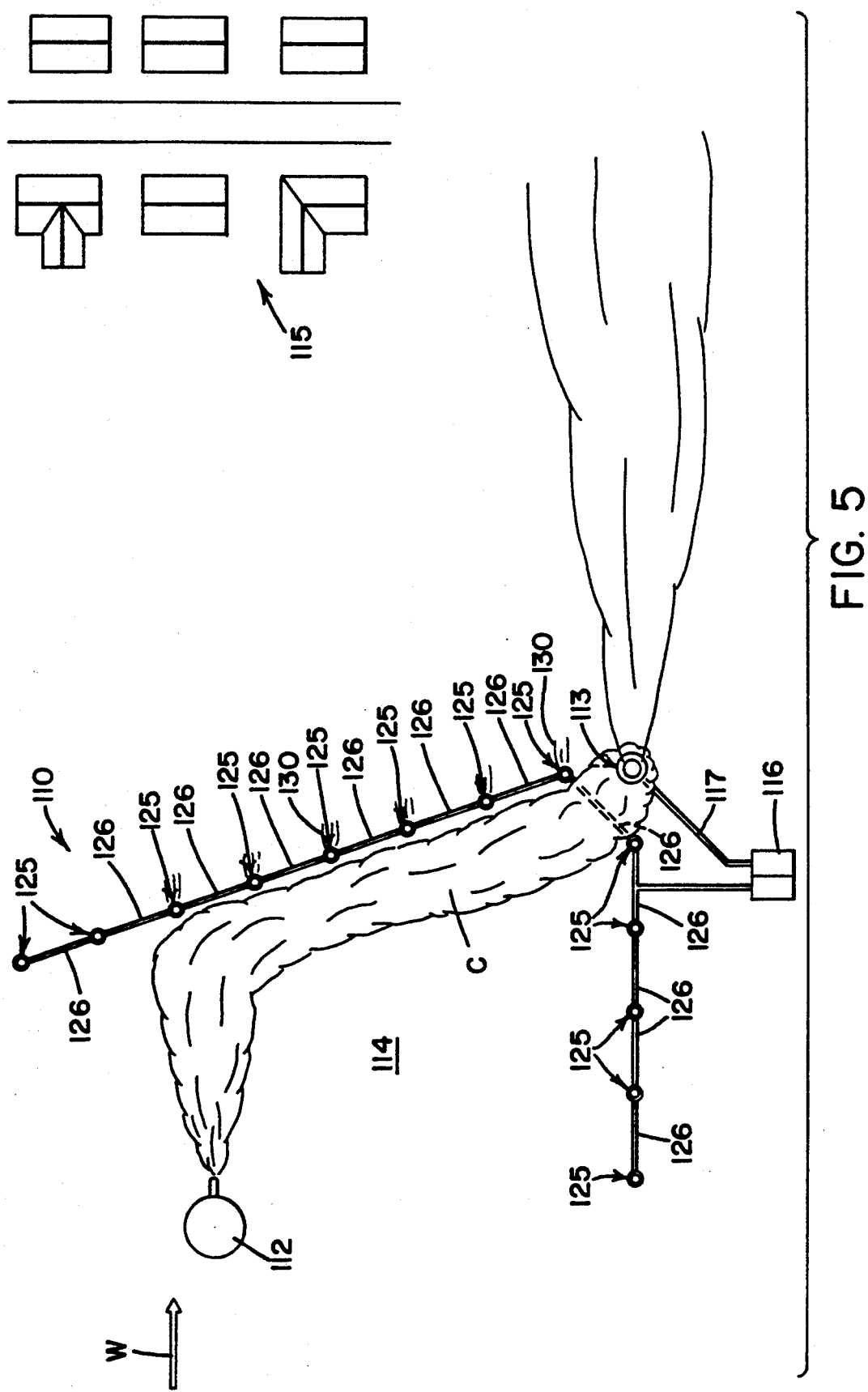
FIG. 5 is a schematic plan view of an alternative system for mitigating the effect of an environmental release of a contaminant gas embodying the concept of the present invention.

The foregoing description of an exemplary system 10 contemplates use of nozzles 13 which are positioned in the free path of the contaminant cloud. It must be appreciated that such is not an exclusive embodiment of the invention. Indeed, the foregoing advantages and characteristics are likewise associated with at least one alternative embodiment, as depicted in FIG. 5. The system 110 of FIG. 5 is substantially the same as the system 10 described hereinabove but has been presented separately for the instance where nozzles 125 are positioned in such fashion to divert the contaminant cloud C from its free path to a remote nozzle 113 efficiently to mitigate the effect thereof.

In the alternative system 110, a control zone 114 adjacent a tank 112 of hazardous material may be defined by the installation of a plurality of nozzles 125 and a lesser number of nozzles 113. These nozzles 113 and 125 may be positioned to surround central zone 114, or may be positioned only at select locations thereabout, as discussed hereinabove. It is appreciated that such nozzles at least be positioned strategically to present a barrier between tank 112 and the area to be protected, for example, a town 115. Nozzles 113 and 125 are suitably interconnected fluidly by plumbing 117 and 126, respectively, to a suitable fluid source 116. As indicated hereinabove, nozzles 113 and 125 alternatively may have integral compressor to provide a suitable control fluid from the surrounding atmosphere and contaminant gas.

Nozzles 125 may emit a single control stream 130 of a fluid, as for example, air, steam or contaminant gas. Such nozzles 125 serve as a barrier to retard the travel of a contaminant cloud C caused by the prevailing wind W. When the contaminant cloud C encounters nozzles 125, a portion will be entrained with the control fluid and the surrounding air to enable dispersion in the upper atmosphere.

The majority of the contaminant cloud C, upon encountering the barrier defined by nozzles 125, will be directed therealong by the prevailing wind W to a region having one or more nozzles 113. Redirection of the contaminant cloud C may be facilitated by the orientation of nozzles 125, which could be positioned suitably to direct the contaminant cloud C to compound nozzle 113. As discussed hereinabove, compound nozzle 113 may provide one or more control fluids, and/or a flame, which serve not only to diffuse and disperse the contaminant cloud C but also to neutralize, consume or otherwise alter the same into a non-hazardous form.

It will be appreciated that system 110 may prove more economically desirable than system 10. As a neutralizing agent is introduced to the contaminant cloud C by only a few, selectively located nozzles 113, less neutralizing agent is required while still achieving the desired mitigation. Furthermore, such mitigating reaction can be carried out in a location which may be more remote from the protected environment to minimize further any risk to the environment.

In each of the foregoing embodiments, it should be evident that should a contaminant be released which is combustibly unstable in high concentrations, such as a hydrocarbon, the system 10/110 need not be activated thereby avoiding creation of dangerous turbulence in the contaminant cloud. Instead, the contaminant cloud may be permitted to travel unrestrictedly to entrain air and dissipate naturally. Alternatively, the system 10/110 may be partially activated, to introduce control fluids and neutralizing agents in a manner suitable to minimize turbulence and thereby minimizing the risk of an unconstrained vapor cloud explosion.

It should also be appreciated that, while the present invention has been described in conjunction with two permanent installations, the advantages and characteristics are likewise associated with other installations. Specifically, the present invention may be mobile, capable of being transported to and deployed at the site of a contaminant release, such as a tractor-trailer, pipeline or railroad car spill.

In view of the foregoing disclosure, it should be evident that a system to mitigate the effect of an environmental release of a contaminant gas, which system embodies the concept of the invention disclosed herein, enables such a contaminant gas to be dispersed and/or neutralized in a non-hazardous manner through the controlled introduction of fluids, reactants and/or flame. Furthermore, the present invention permits the contaminant gas to be directed away from a protected environment and suitably mitigated in a safe and controlled manner. As such, the foregoing carries out the various objects of the invention and otherwise constitutes an advantageous contribution to the art.

I claim:

1. A system to mitigate the effect of an environmental release of a contaminant gas cloud from an industrial operation comprising:

an industrial operation; a plurality of first fluid effect devices positioned in the vicinity of the industrial operation so as to encounter an environmental release of a contaminant gas cloud from the industrial operation;

each of said first fluid effect devices having a top and a bottom portion and an outer and an inner surface, said outer surface being positioned such that a substantial portion thereof is caused to be exposed to the contaminant gas;

means proximate each said bottom portion of said first fluid effect devices to discharge selectively and transversely across said outer surface and in proximity to the contaminant gas, a first fluid stream from said first fluid effect devices;

means to discharge a second fluid from said first fluid effect devices, within said inner surface and separate from said first fluid stream, whereby said first and second fluid streams intermix above said first fluid effect devices and with the contaminant gas; and means for igniting a flame from at least one of said first fluid effect devices in conjunction with said first fluid stream discharged therefrom.

2. A system, according to claim 1, further comprising at least one second fluid effect device positioned in the vicinity of the environmental release and at least one of said first fluid effect devices, and means to discharge a fluid stream from at least one said second fluid effect device proximate to the contaminant gas.

3. A system, according to claim 2, wherein said second fluid effect device is positioned to intercept and redirect the flow of at least some of the contaminant gas.

4. A system, according to claim 1, wherein said means proximate each said bottom portion of said first fluid effect devices to discharge includes a circumferential orifice.

5. A system to mitigate the effect of an environmental release of a contaminant gas cloud from an industrial operation comprising:

an industrial operation; a plurality of first fluid effect devices positioned in the vicinity of the industrial operation so as to encounter an environmental release of a contaminant gas cloud from the industrial operation;

each of said first fluid effect devices having a top and a bottom portion and an outer and inner surface, said outer surface being positioned such that a substantial portion thereof is caused to be exposed to the contaminant gas;

means proximate each said bottom portion of said first fluid effect devices to discharge selectively and transversely across said outer surface and in proximity to the contaminant gas, a first fluid stream from said first fluid effect devices;

whereby said first stream intermixes above said first fluid effect devices with the contaminant gas; and means for igniting a flame from at least one of said first fluid effect devices in conjunction with said first fluid stream discharged therefrom.

* * * * *